United States Patent [19]

Studdard

[11] 3,939,571

[45] Feb. 24, 1976

[54] METHOD AND APPARATUS FOR AIMING AIRCRAFT VISUAL APPROACH SLOPE INDICATOR

[75] Inventor: James F. Studdard, Lake View Terrace, Calif.

[73] Assignee: West Tech Systems, Inc., Los Angeles, Calif.

[22] Filed: June 26, 1974

[21] Appl. No.: 483,197

[52] U.S. Cl. .................... 33/180 R; 33/375; 33/388
[51] Int. Cl.² ......................................... G01C 9/28
[58] Field of Search.......... 33/180 R, 388, 386, 371, 33/375

[56] References Cited
UNITED STATES PATENTS

| 926,770 | 7/1909 | Roller | 33/388 |
| 2,097,849 | 11/1937 | Torbert | 33/388 |

FOREIGN PATENTS OR APPLICATIONS

| 1,043,930 | 9/1966 | United Kingdom | 33/386 |

Primary Examiner—William D. Martin, Jr.
Attorney, Agent, or Firm—Nilsson, Robbins, Bissell, Dalgarn & Berliner

[57] ABSTRACT

An aiming bar is inserted through the aiming slit of an aircraft visual approach slope indicator housing and secured at its inner end to a cross bar in front of a horizontal row of landing lights so that the aiming bar assumes the vertical angle of the upwardly directed light beam. A pivot bar is mounted on the aiming bar and aligned with an angle plate mounted on the aiming bar to indicate the slope of the approach indicator.

The alignment assembly is calibrated using a T-shaped calibration bar positioned in a rigid carrying case. A pin at each end of the T-cross arm and at the remote end of the T-leg rests on respective mounting pedestals whereby the calibration bar is held in a raised position and leveled by adjustment of at least two of the pins to provide a horizontal platform for mounting the alignment assembly. The aiming bar is horizontally mounted on the T-leg and the pivot bar is set to a horizontal angle plate reading. If the pivot bar is level, the operator is assured that the alignment assembly is correctly calibrated.

5 Claims, 6 Drawing Figures

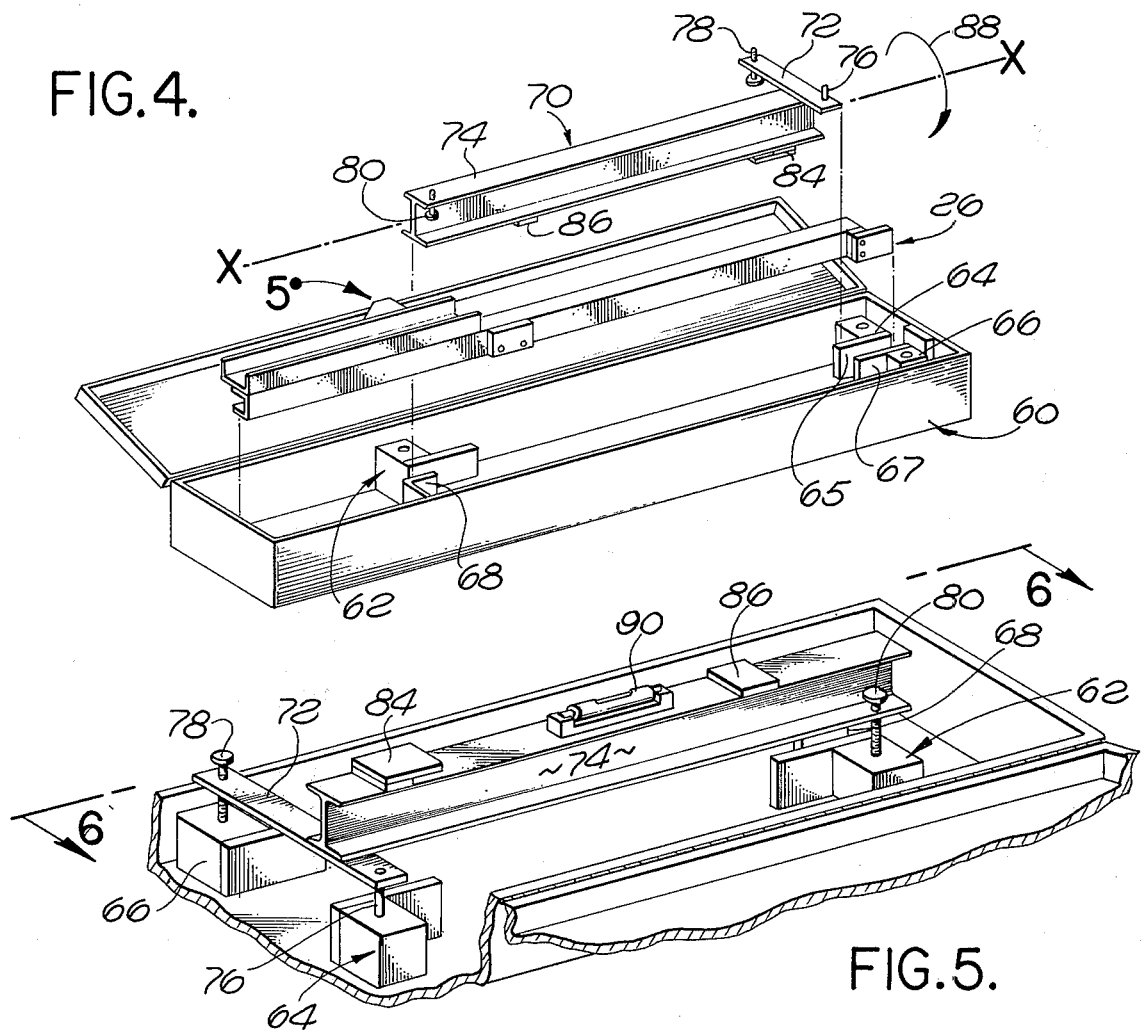
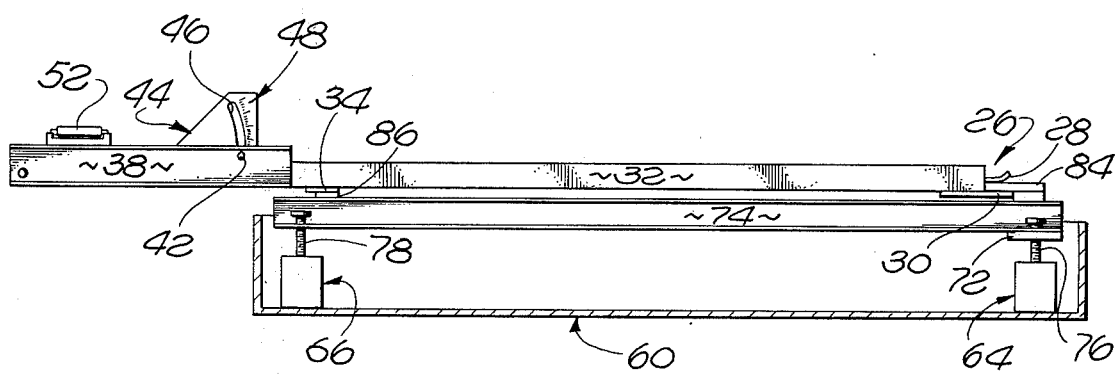

METHOD AND APPARATUS FOR AIMING AIRCRAFT VISUAL APPROACH SLOPE INDICATOR

BACKGROUND OF THE INVENTION

The method and apparatus of this invention concern airport landing lights, and specifically a method and apparatus for aiming visual approach slope indicators which direct a beam of light at approaching aircraft to indicate to the pilot whether he is within the appropriate glide path which has been predetermined for aircraft approaching the particular runway. Such aircraft visual approach slope indicators are spaced intermittently along one or both sides of airport runways to aim narrow split beams of light, elongated in the horizontal plane, at approaching aircraft. Typically, the upper beam segment is white and the lower segment is red with the transition zone being pink. The farthest light unit of a two unit system, for example, is aligned and positioned so that the bottom of the red or lower segment is parallel to the glide path and forms the upper limit of the ideal glide path. In such a system, the light unit closest to approaching aircraft is aligned and positioned so that the top of the white or upper segment is aimed into the glide path and the bottom of the white segment is approximately parallel to the glide path and forms the lower limit of the ideal glide path. When an aircraft is on the proper glide path, the closest unit will appear white to the pilot and the farthest will appear red. If the approach is too high, both units will be seen as white and a low approach is indicated by both units appearing red.

Such visual approach slope indicators normally consist of a rectangular housing having adjustable legs at each corner so that the correct vertical angle of the narrow elongated light beam can be maintained by periodically verifying and adjusting the slope of the indicator housings. Previous alignment or aiming procedures employed an airplane flying the correct glide path as indicated by a person on the ground tracking the airplane. When the correct glide path was attained, the pilot would report any lights which were not properly visible and adjustments would be made on the spot by a third individual on the ground adjusting the legs of the various visual approach slope indicators. If the number of required adjustments consumed any considerable length of time, the airplane would be required to make a number of passes in order to provide the individual adjusting the indicator with sufficient time to complete the job. Such a procedure is obviously extremely time consuming and expensive in terms of personnel and equipment.

SUMMARY OF THE INVENTION

An alignment assembly is provided for determining alignment of an aircraft visual approach slope indicator where the indicator housing contains at least one landing light spaced from an aiming slit. A first linear member projecting into the indicator housing through the aiming slit is removably secured at its inner end adjacent the center of the landing light. A second rigid linear member pivotally mounted on the first member outside the indicator housing in a vertical plane parallel to the vertical plane of the first member is rotated to extend back towards the housing. Means are provided for indicating when the second member is level and further means are provided for indicating the acute vertical angle between the first member and the rearwardly extending level second member to thereby show the slope of the approach indicator.

In one embodiment of the invention, the free end of the second alignment assembly member is clamped to a slotted angle plate so that the top surface of the member is aligned with a mark on the plate indicating the acute angle between first and second members. This acute angle is the vertical angle of the directed light beam. In order to ensure accuracy of the alignment assembly, a rigid rectangular portable carrying case provides three mounting pedestals for receiving pins extending from the two ends of the cross arm and from the remote end of the leg of a T-shaped calibration bar. At least two of these pins are adjustable to form an adjustable tripod mounted calibration bar, and the T-leg of the calibration bar is provided with means for mounting the first linear member of the alignment assembly parallel to and above the T-leg. When the first member is positioned on the leveled calibration bar, the second member is rotated until its top surface indicates a zero angle on the plate between the first and second members. If the means for indicating the leveled position of the second member show that the second bar lies in a horizontal plane, the alignment assembly may be assumed to be accurately calibrated.

BRIEF DESCRIPTION OF THE DRAWINGS

The invention may best be understood when considered in light of the following detailed description in conjunction with the accompanied drawings, wherein:

FIG. 4 is a perspective, exploded view of the calibration bar of one embodiment of this invention and the alignment assembly ready for placement in a carrying case;

FIG. 5 is a rotated, partially sectioned, perspective of the calibration apparatus shown in FIG. 4 as viewed from position 5 in FIG. 4 and as assembled for calibration of the alignment assembly; and FIG. 6 is an elevational view taken along the line 6—6 of FIG. 5 showing the alignment assembly of FIG. 3 mounted on the calibration bar positioned on the mounting pedestals in the carrying case.

DETAILED DESCRIPTION

Figure 1:
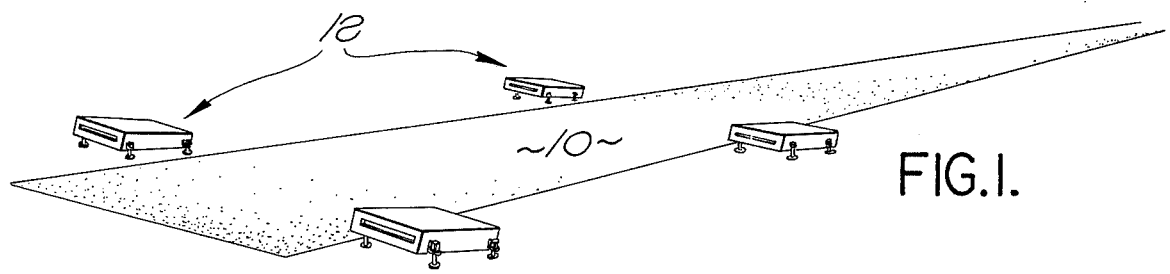
FIG. 1 is a perspective view of the prior art aircraft visual approach slope indicators positioned at the end of the runway and aligned along either side thereof.
Figure 2:
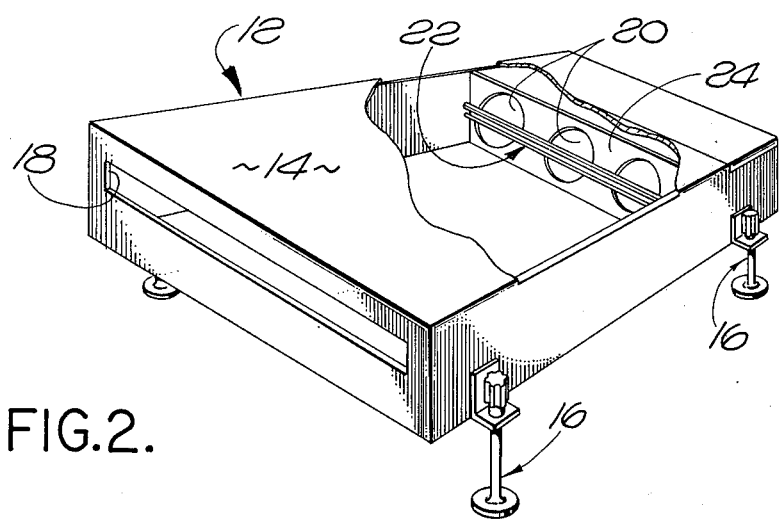
FIG. 2 is a partially sectioned, perspective view of an aircraft visual approach slope indicator.
Figure 3:
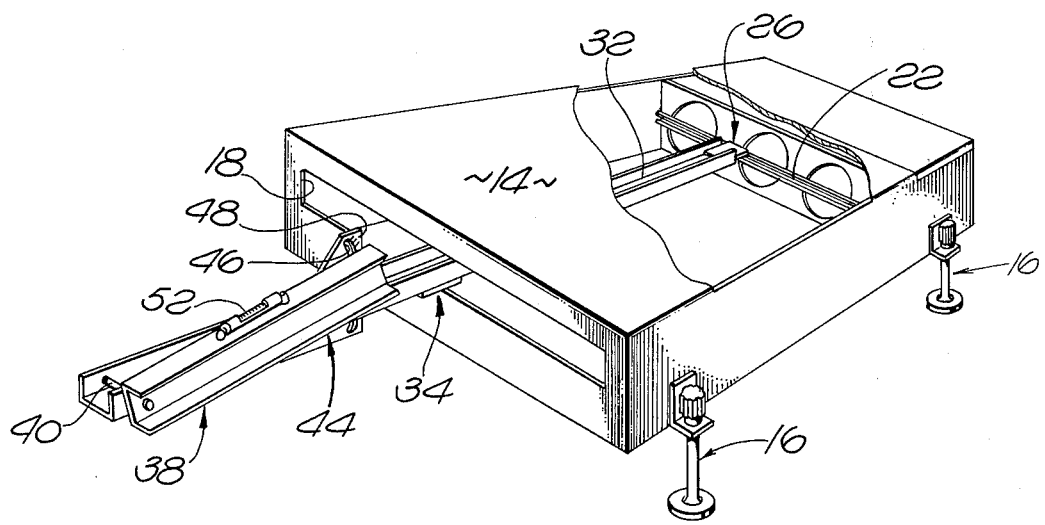
FIG. 3 is a partially sectioned, perspective view of an aircraft visual approach slope indicator with the alignment assembly of this invention installed.

Typical aircraft visual approach slope indicators 12 are shown in FIG. 1 aligned along each side of the end of the runway 10 in a relatively close group which may be observed at a distance by approaching aircraft. As is shown in FIGS. 2 and 3, each rectangular indicator housing 14 is supported by four adjustable legs 16 so that the aiming slit 18 and row of landing lights 20 may be adjusted to position their longitudinal axes in horizontal planes. In addition, the indicator housing legs 16 are vertically adjustable to direct an elongated narrow beam of light, as previously described, from the row of landing lignts 20 through the aiming slit 18 at the proper vertical angle.

A thin channeled cross bar 22, mounted on bulkhead 24, extends parallel to the longitudinal axis and in front of the row of landing lights 20 and provides a support for engagement by a spring clip 26 secured to the inner end of a bar component 32 of an alignment assembly as is shown in FIGS. 3, 4 and 6 and as will be described in more detail hereafter.

As may be more clearly seen in FIG. 6, the spring clip 26 consists of a rigid plate 30 and a spring metal plate 28 fixed to opposite sides of the bottom of a channeled bar 32, called an aiming bar, to form clip jaws which grip the top and bottom surfaces of the crossbar when the aiming bar 32 is inserted through the aiming slit 18. An aperture pad 34 secured to the bottom of the aiming bar rests on the lower edge of the slit 18 to position the aiming bar at the same angle as the vertical angle of the light beam passing from the aiming slit 18.

A channeled pointer arm or pivot bar 38 is pivotally mounted on a pin 40 at the outer end of the aiming bar 32 so that the pointer arm extends rearwardly back towards the indicator housing 14. The inner end of the pointer arm carries a clamp, such as a threaded bolt 42, shown in FIG. 6, extending towards the aiming bar and a wingnut (not shown) adapted to be screwed onto the bolt.

A slotted angle plate 44 fixed to the aiming bar adjacent the pointer arm receives the bolt 42 through a plate slot 46, enabling the pointer arm to be clamped in various rotated positions by screwing the wingnut down onto the opposite side of the angle plate. The angle plate carries angle markings 48 alongside the slot which are calibrated to indicate an the acute angle formed between the pointer arm and the aiming bar when an angle marking is aligned with the top surface of the pointer arm 38. For example, FIG. 6 shows the pointer arm and aiming bar aligned in the same horizontal plane and in a configuration so that the top surface of the pointer arm will be aligned with an angle plate marking indicating a zero angle.

As is shown in FIG. 3, in order to align or aim the light beam, the pointer arm 38 is rotated until its top surface is aligned with an angle marking corresponding to the vertical angle at which the light beam is desired to be directed. The pointer arm is clamped in this position by tightening the wingnut onto the bolt 42 against the angle plate 44 and the position of the bubble in the level 52 mounted on the top surface of the pointer arm is observed. Since the slope of the aiming bar corresponds to the vertical angle of the directed light beam, the light beam will be directed at the desired vertical angle, as indicated on the angle plate, when the level 52 shows the pointer arm to be in a horizontal plane or level. In other words, the desired vertical angle for the directed light beam is set as the angle between the aiming bar and the pointer arm, and this should be the same as the vertical angle of the aiming bar. This is achieved by adjusting the indicator housing legs 16 until the level 52 indicates the pointer arm to be level.

In order to achieve the desired degree of accuracy, the pointer arm should be of sufficient length to ensure that normal tolerances in constructing the rigid aiming bar and pointer arm and angle plate, and in machining the angle markings, do not produce serious error in reading the indicated angle. Thus, the pointer arm in the preferred embodiment of the invention is about 28.5 inches in length between the pivot pin 40 and the location where the pointer arm intersects the markings 48.

In order for the alignment assembly to be properly utilized, the aiming bar and the pointer arm must be straight, the level 52 true, and the angle plate accurate. Since such alignment assemblies typically receive very rough treatment, it is not uncommon for the bars or plate to become bent or the level broken. To prevent erroneous alignment assembly readings, a calibration device is provided which includes a rigid metal carrying case 60 serving the dual function of providing protection for the alignment assembly and calibration bar during transport and providing a rigid base on which the calabration bar and alignment assembly may be mounted for calibration. Mounting pedestals 62, 64 and 66 secured to the bottom of the carrying case retain the calibration bar and alignment assembly in position for transport when placed in the carrying case as indicated in FIG. 4. More importantly, however, these mounting pedestals provide a raised surface for the calibration bar tripod leveling arrangement shown in FIG. 5.

Specifically, calibration bar 70 and the alignment assembly may be stored in the carrying case 60, as shown in FIG. 4, by first collapsing the alignment assembly on its side so that the aiming bar and pointer arm are parallel and then inserting the clip 26 between the pedestals 64 and 66 while the angle plate 44 rests behind the pedestal 62. The calibration bar crossarm 72 bears against the ends of the pedestal flanges 65 and 67 while the end of calibration bar leg 74 is maintained between the L-shaped flange 68 and the side of the carrying case.

As may be seen in FIGS. 4–6, the calibration bar is T-shaped, consisting of a crossarm 72 fixed to the bottom of the T-leg 74. One end of the crossarm is shortened, as may be more clearly seen in FIG. 5. A fixed pin 76 is mounted on the shortened crossarm end to provide the pivot point for the calibration bar adjustable tripod arrangement. A pin 78, threaded through the other crossarm end, and a pin 80, threaded through the remote end of the T-leg, provide the two adjustable tripod legs for the calibration bar.

As may be more clearly seen in FIGS. 5 and 6, a raised flange 84 on top of the T-leg receives the aiming bar spring clip 26 and a mounting pad 86 provides a rest for the aperture pad 34.

In order to calibrate the alignment assembly, the calibration bar is first removed from the carrying case in its inverted position so that the alignment assembly may be lifted out. The calibration bar is then rotated 180° about its longitudinal axis $x-x$ as indicated by the arrow 88 in FIG. 4. The two leveling pins 78 and 80 are positioned in the cup-shaped indentations in the top of the mounting pedestals 62 and 66 respectively. The fixed pivot pin 76 is seated in the indentation in the top of the pedestal 64 to provide a fixed point for the three point leveling arrangement.

The threaded leveling pins 78 and 80 are rotated until the level 90, when placed longitudinally and then transversely on the T-leg 74, indicates that the calibration bar T-leg 74 is leveled. The level 90 is then removed and the alignment assembly mounted on top of the calibration bar T-leg as previously described and as shown in FIG. 6. The pointer arm 38 is rotated until its top surface is aligned with a mark on the angle plate 44 indicating a zero angle. The pointer arm is then clamped in the zero position and the adjustable level 52, mounted on the pointer arm top surface, is adjusted until it indicates that the pointer arm is leveled.

This invention thus provides a method and apparatus for conveniently ensuring that the light beam directed at approaching aircraft is aimed at the correct vertical angle. In addition, the operator is provided with a method and apparatus with which to field calibrate the alignment assembly employed.

It will be understood that various modifications may be made in the described embodiments without departing from the scope of the invention. For example, the structural elements employed in the alignment assembly or in the calibration bar may be varied.

What is claimed is:

1. A method for adjusting the vertical angle of an aircraft visual approach slope indicator, wherein the approach indicator includes a vertically adjustable housing containing at least one landing light mounted behind a horizontal crossbar across one housing wall to direct light through a horizontal aiming slit in the opposite housing wall at an adjustable vertical angle towards approaching aircraft, the cross bar being centrally aligned between said light and the slit and the angle of the directed light being determined by adjustment of the vertical angle of the slope indicator housing, comprising the steps of:

leveling a T-shaped calibration bar, having a T-leg and a cross arm, on an adjustable leveling system;

mounting the first linear bar of an alignment assembly on top of and parallel to the calibration bar T-leg, said alignment assembly further comprising: a second linear bar pivotally mounted at one end of the first bar in a vertical plane parallel to the vertical plane of the first bar, said second bar being directed rearwardly back towards the remote end of the first bar and carrying clamping means; a slotted angle plate secured to the first bar adjacent the free end of the second bar for engagement by said clamping means, said angle plate being marked so that the upper surface of the second bar is aligned with an indication of the vertical angle formed between the first and second bars when the second bar is horizontal; and an adjustable level mounted on the upper surface of the second bar;

rotating the second bar to a position parallel to the first bar so that the upper surface of the second bar is aligned with a zero angle indication on the angle plate;

adjusting the adjustable level until it indicates a horizontal position;

removing the alignment assembly from the calibration bar;

mounting the alignment assembly on the aircraft visual approach slope indicator by inserting said remote end of the first bar through the indicator housing slit and securing said remote end to said cross bar whereby said first bar assumes the vertical angle of the directed light;

rotating the second bar until its top surface is aligned with an angle plate indication corresponding to the desired angle of the directed light;

securing the second bar in its rotated position by engaging the clamping means with the slotted angle plate, adjusting the vertical angle of the indicator housing until the level on the second bar indicates a horizontal position; and removing the alignment assembly from the indicator housing.

2. A method for adjusting the vertical angle of an aircraft visual approach slope indicator, wherein the approach indicator includes a vertically adjustable housing containing at least one landing light mounted behind a horizontal crossbar across one housing wall to direct light through a horizontal aiming slit in the opposited housing wall at an adjustable vertical angle towards approaching aircraft, the crossbar being centrally aligned between said light and the slit and the angle of the directed light being determined by adjustment of the vertical angle of the slope indicator housing, comprising the steps of:

mounting a T-shaped calibration bar of a calibration assembly on a support;

leveling said calibration bar by adjusting support pin resting on said support;

said T-shaped calibration bar comprising: a leg and crossarm, a support pin mounted at each end of the crossarm, and a third pin mounted on the remote end of the T-leg, said T-leg pin and at least one of said crossarm pins being adjustable for leveling the calibration bar; said calibration assembly further comprising: means for indicating when the calibration bar is level; and means for removably mounting an alignment assembly on top of and parallel to the calibration bar T-leg;

mounting an alignment assembly on top of and parallel to the calibration bar at the same points and in the same manner as said alignment assembly is designed to be mounted on said slop indicator, said alignment assembly further comprising:

a first rigid linear member for projecting into said housing through said slit and having means for removably securing its inner end adjacent the vertical center of said landing light; a second rigid linear member pivotally mounted on said first member in a vertical plane parallel to the vertical plane of said first member; means for indicating when the second member is horizontal; and means for indicating the vertical pivot angle between said first and second members when said second member is horizontal to thereby show the slope of said approach indicator;

rotating the second bar member to a position parallel to the first member;

adjusting the alignment assembly until a horizontal position is shown by said indicating means;

removing the alignment assembly from the calibration bar;

mounting the alignment assembly on the aircraft visual approach slope indicator by inserting said remote end of the first member through the indicator housing slit and securing said first member to said crossbar whereby said first member assumes the vertical angle of the directed light;

rotating the second member to form the desired angle of the directed light between the first and second members;

adjusting the vertical angle of the indicator housing until the second member is indicated to be in a horizontal position; and removing the alignment assembly from the indicator housing.

3. A system for determining alignment of an aircraft visual approach slope indicator by use of a properly calibrated alignment assembly, wherein the approach indicator housing contains at least one landing light spaced from an aiming slit, and wherein the alignment assembly includes a first rigid linear member for projecting into said housing through said slit and having means for removably securing its inner end adjacent the vertical center of said landing light, a second rigid linear member pivotally mounted on said first member in a vertical plane parallel to the vertical plane of said first member, means for indicating when the second member is horizontal, and means for indicating the vertical pivot angle between said first and second members when said second member is horizontal to thereby show the slope of said approach indicator, the combination with said alignment assembly of calibration means comprising:

a calibration bar comprising a leg and crossarm, a support mounted at each end of the crossarm, and a third support mounted on the remote end of said leg, said leg support and at least one of said crossarm supports being adjustable for leveling the calibration bar;

means for indicating when the calibration bar is level; and, means for removably mounting said first linear member of the alignment assembly on top of and parallel to the calibration bar.

4. A system for determining the vertical angle of an aircraft visual approach slope indicator by use of a properly calibrated alignment assembly, wherein the approach indicator includes a vertically adjustable housing containing at least one landing light mounted behind a crossbar on one housing wall to direct light at an adjustable vertical angle towards approaching aircraft through an aiming slit in the opposite housing wall, the crossbar being centrally aligned between said light and the slit and the adjustable angle being determined by adjustment of the vertical angle of the slope indicator housing, and wherein the alignment assembly includes a first rigid linear bar for projecting into said housing through said slit and having means for detachably securing its inner end to said crossbar, whereby said first bar assumes the vertical angle of the directed light, a second rigid linear bar for location outside the housing pivotally mounted on the outer end of said first bar in a vertical plane parallel to the vertical plane of said first bar, said second bar being directable rearwardly back towards the housing and having clamping means mounted on its rearward end, a slotted angle plate secured to the first bar adjacent the rearward end of the second bar for engagement by said clamping means passing through the slot of said plate, said angle plate being marked so that the upper horizontal surface of the second bar is aligned with an indication of the angle formed between the first and second bars when the second bar is horizontal, and means for indicating when the second bar is horizontal, said horizontal indicating means, said first and second bars, and said angle plate constituting an alignment assembly, the combination with said alignment assembly of calibration means comprising:

a support member adapted to mount a calibration bar;

a T-shaped calibration bar comprising a T-leg and crossarm, a pin mounted at each end of the crossarm, and a third pin mounted on the remote end of the T-leg, said pins being adapted to be positioned on said support member and said T-let pin and at least one of said crossarm pins being adjustable for leveling the calibration bar;

means for indicating when the calibration bar is level; and means for removably mounting said first linear bar of the alignment assembly on top of and parallel to the calibration bar T-leg at the same points on said first linear bar and in substantially the same manner as said first linear bar is designed to be mounted on said slope indicator.

5. An apparatus for determining the vertical angle of an aircraft visual approach slope indicator, wherein the approach indicator includes a vertically adjustable housing containing at least one landing light mounted behind a crossbar on one housing wall to direct light at an adjustable vertical angle towards approaching aircraft through an aiming slit in the opposite housing wall, the crossbar being centrally aligned between said light and the slit and the adjustable angle being determined by adjustment of the vertical angle of the slope indicator housing, comprising:

a first rigid linear bar for projecting into said housing through said slit and having means for automatically detachably securing the inner end of said first bar to said crossbar when the first bar contacts the crossbar, whereby said first bar assumes an operative position aligned with the vertical angle of the directed light;

a second rigid linear bar for location outside of the housing when the first bar is operatively positioned, said second bar being pivotally mounted on the outer end of of said first bar in a vertical plane parallel to the vertical plane of said first bar, said second bar being directable rearwardly back towards the housing and having clamping means mounted on its rearward end;

a slotted angle plate secured to the first bar adjacent the rearward end of the second bar for engagement by said clamping means passing through the slot of said plate, said angle plate being marked so that the upper horizontal surface of the second bar is aligned with an indication of the angle formed between the first and second bars when the second bar is horizontal; and, means mounted on said second bar for indicating when the second bar is horizontal, said horizontal indicating means, said first and second bars, and said angle plate constituting an alignment assembly.

* * * * *